(12) United States Patent
Jones et al.

(10) Patent No.: US 8,753,863 B2
(45) Date of Patent: Jun. 17, 2014

(54) CARBON SEQUESTRATION USING A FLOATING VESSEL

(75) Inventors: Ian Stanley Ferguson Jones, New South Wales (AU); William Rodgers, New South Wales (AU); Robert John Wheen, New South Wales (AU); Bruce Joseph Judd, New South Wales (AU)

(73) Assignee: Ocean Nourishment Corporation Pty Limited, Allambie Heights, NSW (AU)

( * ) Notice: Subject to any disclaimer, the term of this patent is extended or adjusted under 35 U.S.C. 154(b) by 1172 days.

(21) Appl. No.: 12/597,700

(22) PCT Filed: Jun. 22, 2007

(86) PCT No.: PCT/AU2007/000872
§ 371 (c)(1),
(2), (4) Date: Apr. 5, 2010

(87) PCT Pub. No.: WO2008/131472
PCT Pub. Date: Nov. 6, 2008

(65) Prior Publication Data
US 2010/0210005 A1   Aug. 19, 2010

(30) Foreign Application Priority Data

Apr. 27, 2007 (AU) .............................. 2007902217

(51) Int. Cl.
*C12M 1/00* (2006.01)
*C12N 1/38* (2006.01)
*C12Q 1/58* (2006.01)

(52) U.S. Cl.
USPC ........... 435/244; 435/12; 435/283.1; 435/975

(58) Field of Classification Search
None
See application file for complete search history.

(56) References Cited

U.S. PATENT DOCUMENTS

| | | |
|---|---|---|
| 5,567,221 A | 10/1996 | Larson et al. |
| 5,965,117 A | 10/1999 | Howard et al. |
| 5,992,089 A | 11/1999 | Jones et al. |
| 6,056,919 A | 5/2000 | Markels |
| 6,200,530 B1 | 3/2001 | Markels |
| 2004/0161364 A1 | 8/2004 | Carlson |

FOREIGN PATENT DOCUMENTS

| | | |
|---|---|---|
| AU | 660913 | 7/1995 |
| CN | 1710095 | 12/2005 |
| WO | 95/29583 | 11/1995 |
| WO | WO 96/20589 | 7/1996 |
| WO | 2006024070 | * 3/2006 |

OTHER PUBLICATIONS

Extended EP Search Report mailed Jul. 17, 2013 in corresponding European Application No. 07719111.2, 5 pgs.

* cited by examiner

*Primary Examiner* — Debbie K Ware
(74) *Attorney, Agent, or Firm* — Fish & Richardson P.C.

(57) ABSTRACT

Disclosed is a method for removing carbon dioxide from the atmosphere. The method comprises the step of delivering urea from a floating vessel to a region of a photic zone of the ocean, whereby the number of phytoplankton is caused to increase in the region upon addition of the urea. The method can be used for producing carbon cells.

20 Claims, No Drawings

CARBON SEQUESTRATION USING A FLOATING VESSEL

This application claims the benefit of International Application Number PCT/AU2007/000872, filed on Jun. 22, 2007, and Australian Application No. 2007902217, filed on Apr. 27, 2007, both of which are incorporated herein by reference in their entirety.

TECHNICAL FIELD

Disclosed is a method for removing carbon dioxide from the atmosphere.

BACKGROUND ART

The carbon dioxide concentration in the atmosphere is rising as a result of fossil fuel burning, bringing with it the threat of undesirable climate change. At the same time, the fishing industry seems to be exploiting the ocean's resources beyond its carrying capacity. Increased photosynthesis may address both of these issues by converting inorganic carbon (carbon dioxide) to organic carbon (vegetable matter) in a body of water. Such vegetable matter is the base of the marine food chain.

The natural process by which carbon dioxide is converted into organic carbon is known. When atmospheric carbon dioxide dissolves in the ocean it exists in an ionic form and can be taken into the bodies of marine phytoplankton through the process of photosynthesis. The phytoplankton eventually perish through age or are eaten by other marine organisms. Some of the resulting dead or excreted biomass then falls to the lower levels of the water column whereby at least some of the carbon is effectively stored away from the atmosphere for long periods of time.

In some regions of the ocean, the conversion of carbon dioxide dissolved at the surface of the ocean to organic carbon is limited by the availability of specific nutrients. For example, phytoplankton growth is limited in some 80% of the ocean by the lack of the macronutrient nitrogen.

SUMMARY OF THE DISCLOSURE

In a first aspect, there is provided a method for removing carbon dioxide from the atmosphere. The method comprises the step of delivering urea from a floating vessel to a region of a photic zone of an ocean, whereby the number of phytoplankton is caused to increase in the region upon addition of the urea.

This method involves delivering an exogenous source of nitrogen (i.e. urea) to a specific layer of the ocean at a specific location to stimulate the growth of the phytoplankton population in that region and so cause an increase in the photosynthetic activity of the phytoplankton population. This method can be utilised to decrease the atmospheric $CO_2$ concentration because, as inorganic carbon present in the photic zone of the ocean is used in the photosynthesis carried out by the phytoplankton, further $CO_2$ is caused to diffuse into the ocean from the atmosphere. The increased number of phytoplankton will eventually die and fall to the lower levels of the water column. Accordingly, the addition of urea to the photic zone can cause the ocean to be a sink for $CO_2$ and can result in a reduction in the $CO_2$ concentration in the atmosphere.

As the skilled addressee will appreciate, since phytoplankton is the base of the marine food web, increasing numbers of phytoplankton may also result in an increase in ocean fish biomass.

In the method described above, urea is delivered to the photic zone of an ocean from a floating vessel. Delivering a source of nitrogen (i.e. urea) from a floating vessel has a number of advantages over other methods of delivery, such as via a pipeline. For example, it might not be economically viable to provide the nutrient by pipeline because of the extensive length of pipe required to reach an appropriate region of the ocean, as well as the ongoing costs of maintaining the pipeline. Furthermore, a land based facility is required for pumping the source of nitrogen through the pipeline, which would further increase the cost.

Furthermore, as noted earlier, phytoplankton growth is limited in some 80% of the ocean by the lack of the macronutrient nitrogen. A portable floating vessel can assist in the delivery of a source of nitrogen (i.e. urea) to such regions.

Urea can be supplied as a granular white material and is extensively used in agriculture. Urea occurs naturally in sea water as a result of the bacterial decay of dead phytoplankton or zooplankton excretions. It has numerous advantages over many other nitrogen containing compounds, such as ammonia, in that it can be easily stored and transported, is not caustic and is pH neutral. In contrast, ammonia (or solutions of ammonia) is caustic, toxic and classified as a dangerous chemical.

Typically, the region is located such that carbon dioxide is sequestered from the atmosphere for a significant period of time (e.g. greater than 100 years). The deeper the dead phytoplankton and other derived organic matter can sink out of the photic zone, the longer the carbon is kept away from the surface area of the ocean. Thus, in at least preferred embodiments, the urea is delivered to the photic zone in a region of the ocean having a depth sufficient to allow dead said phytoplankton and organic material derived from the phytoplankton to fall from the mixed layer and enable carbon from the $CO_2$ to be sequestered from the atmosphere for considerable time (or alternatively, to a location where ocean currents will carry the source of nitrogen and additional phytoplankton to such a region).

The region may, for example, be located at the edge of a continental shelf or over a deep ocean, where the organic matter can sink to a depth of 1000 m or more.

In some embodiments, the urea is transported on the floating vessel in granular form and is mixed with water taken from the region immediately before delivery. As a person skilled in the art will appreciate, the properties (e.g. temperature, density and salinity) of a solution of urea dissolved in such seawater will be similar to those of the seawater into which the urea is to be delivered. Indeed, if the solution of urea is a relatively dilute solution, its properties will be very similar to that of the surrounding seawater. As such, the seawater containing the urea will not appreciably rise or fall in the water column before the phytoplankton are able to access the nitrogen in the urea.

The urea is typically injected into the region at a predetermined depth (e.g. between 15 and 50 m) in order to form a concentrated solution at the depth most suitable for phytoplankton growth. This depth can be dependent on a number of factors, for example, few phytoplankton exist below 100 m because very little sunlight penetrates that deep into the ocean. Similarly, few phytoplankton exist in the top few meters of the ocean because the sunlight is too intense.

In alternate embodiments, the urea is in granular form and is sprinkled from the floating vessel over the surface of the ocean above the region. The granules of urea may contain air pockets inside the granules, which slows the rate at which the granules sink so the nitrogen does not sink out of the photic zone.

In some embodiments, the amount of urea delivered to the region results in the concentration of urea in the region being between about 0.1 µmole/L to about 10 µmole/L. Concentrations of less than about 0.1 µmole/L urea do not cause a significant growth in the number of phytoplankton, while concentrations above about 10 µmole/L urea can cause too much phytoplankton growth. To achieve such a concentration of urea, a 5% w/v to 20% w/v solution of urea in seawater can be pumped into the photic zone to raise the concentration of urea in the immediate vicinity of the outlet. This concentrated urea solution will subsequently be dispersed by ocean currents and turbulence to provide a concentration of urea sufficient to support an appropriate amount of phytoplankton growth.

Alternatively, the concentration of urea may be raised by between about 0.1 µmole/L to about 1 µmole/L, or about 1 µmole/L to about 10 µmole/L, or about 0.1 µmole/L to about 0.5 µmole/L, or about 0.5 µmole/L to about 1 µmole/L, or about 1 µmole/L to about 5 µmole/L, or about 5 µmole/L to about 10 µmole/L, of seawater.

In some embodiments, one or more additional macronutrients (e.g. phosphates) may be delivered to the photic zone with the urea.

In some embodiments, one or more micronutrients (e.g. iron) may be delivered to the photic zone with the urea.

In some embodiments, the method of the first aspect comprises the additional step of monitoring the increased number of phytoplankton, and adding more urea to further increase or maintain an increased number of phytoplankton.

In a second aspect, there is provided a method for removing carbon dioxide from the atmosphere. The method comprises the steps of delivering a source of nitrogen from a floating vessel to a region of the photic zone of an ocean, whereby the number of phytoplankton is caused to increase in the region upon addition of the source of nitrogen, monitoring the increased number of phytoplankton, and adding more of the source of nitrogen to portions of the region in which it is possible to further increase or maintain an increased number of phytoplankton.

The increased number of phytoplankton may, for example, be monitored by satellite. Alternatively, the increased number of phytoplankton may be monitored by a second boat or ship downstream of the floating vessel.

In some embodiments, a dye such as hydrogen hexafluoride may be delivered to the photic zone with the source of nitrogen to aid in monitoring the increased number of phytoplankton.

Preferably, the source of nitrogen used in the method of the second aspect is urea. However, in some embodiments, notwithstanding the difficulties described above, the source of nitrogen used can be ammonia or one of its salts (either in solution or in the gas phase). Ammonia also occurs naturally in sea water as a result of the bacterial decay of dead phytoplankton or zooplankton excretions. Other sources of nitrogen such as sodium nitrate and nitric acid may also be used in the method of the second aspect.

In a third aspect, there is provided a method for producing carbon credits comprising the step of removing carbon dioxide from the atmosphere using the method of the first or second aspect.

The use of such a method for producing carbon credits may make it highly desirable to industries which require their carbon emissions to be offset.

DETAILED DESCRIPTION OF SPECIFIC EMBODIMENTS

Specific embodiments of the methods set forth in the summary will now be described.

In the methods described above, carbon dioxide is sequestered from the atmosphere by adding a source of nitrogen (e.g. urea) to a region of the photic zone of an ocean to cause an increase in the number of phytoplankton. Such activity is also known as Ocean Nourishment (which is a trade mark of Earth, Ocean and Space Pty Ltd), which is the purposeful introduction of nutrients to the upper ocean for the purpose of storing carbon and enhancing the sustainable supply of marine protein.

Typically, the photic zone (also known loosely as the mixed layer) extends from the surface of the ocean to a depth of about 50 meters. However, the photic zone may extend to a depth of 100 meters or more. The actual depth of the photic zone varies, and is dependent upon a number of factors including wind strength and the loss of heat due to the temperature difference between the oceanic surface waters and the lower atmosphere.

The region referred to above must be a region of the ocean which is deficient in nitrogen in order for the addition of the source of nitrogen to cause the number of phytoplankton to increase. As noted above, it is thought that phytoplankton growth is limited in up to 80% of the ocean by the lack of the macronutrient nitrogen. It is within the ability of the person skilled in the art to determine appropriate regions to fertilise in accordance with these methods.

When using these methods, the organic carbon produced by photosynthesis can be exported from the photic zone to the deep ocean and retained there for some time. This occurs either by subduction of surface waters or by sinking of particulate organic detritus out the upper ocean. It is believed that carbon dioxide may be sequestered from the atmosphere for at least 100 years, and possibly for up to 500 years or 1000 years, or even longer, depending on the location and ocean currents.

In the first aspect, and in some embodiments of the second aspect, urea is delivered to the region from the floating vessel. Urea is highly soluble and, when involved in photosynthesis in the ocean, can cause the upper ocean to become less acidic. Adding urea to the ocean may therefore counter the effect of increased levels of carbon dioxide in the atmosphere causing the pH of the upper ocean to decrease.

Typically, the amount of the nitrogen containing compound (e.g. urea) delivered to the region results in the concentration of the nitrogen containing compound in the region being between about 0.1 µmole/L to about 10 µmole/L. To achieve such a concentration, a concentrated solution (e.g. a solution containing 5% w/v of urea) of the nitrogen containing compound in seawater can be pumped into the photic zone to raise the concentration of the compound in the immediate vicinity of the outlet. This concentrated patch is subsequently dispersed by ocean currents and turbulence to provide an appropriate concentration of available nitrogen to support phytoplankton growth.

The concentration of the nitrogen containing compound may be raised by between about 0.1 µmole/L to about 1 µmole/L, or about 1 µmole/L to about 10 µmole/L, or about 0.1 µmole/L to about 0.5 µmole/L, or about 0.5 µmole/L to about 1 µmole/L, or about 1 µmole/L to about 5 µmole/L, or about 5 µmole/L to about 10 µmole/L, of seawater.

An example of how specific embodiments of the methods set forth above could be carried out will now be described.

The hold of a floating vessel in the form of a ship could be loaded with urea, preferably in the form of granular urea, which is not classified as a dangerous chemical and has suitable storage stability and flow properties. The ship could then sail to any region of the ocean in which the phytoplankton population would be caused to increase upon addition of urea and where the organic carbon produced would sink to a depth where it would not be quickly recirculated back to the surface. For example, the ship could be anchored at the edge of a continental shelf or floating over the deep ocean.

Once the ship was located at the desired region of the ocean, the urea could be blown into a venturi, mixed with seawater to provide a solution of about 5% w/v urea, and the resultant solution injected via a pipe from the ship to a depth of the photic zone that is determined to be most suitable for phytoplankton growth in that region.

The seawater used to dissolve or suspend the urea would ideally be taken from the region of the photic zone to which the urea was to be injected so the injected water will have a similar temperature and density to the surrounding water. If the injected solution/surrounding water have similar properties, then the urea will remain in the photic zone at approximately the level at which it was injected for long enough to be diluted by natural processes, thus enabling the phytoplankton to photosynthesise. Should the urea sink out of the photic zone it would no longer be accessible to the phytoplankton. Similarly, should the injected solution be significantly less dense than the surrounding seawater, it could float towards the surface where the urea may also become inaccessible to phytoplankton because phytoplankton do not tend to exist close to the surface of the ocean where the sunlight is too intense.

The predetermined depth at which the urea/seawater solution was injected would depend on the depth of the photic zone in the region, which could readily be calculated on the ship before injection, but which would typically be between about 15 and about 50 meters.

Alternatively, a dense solution of urea and seawater could be sprayed out into the water, where it would subsequently sink to near the centre of the photic zone. As noted above, phytoplankton tend to live near the mid-depth of the photic zone.

Alternatively, an appropriate quantity of the urea in granular form could be sprinkled from the floating vessel over the surface of the ocean, where it would subsequently sink to near the centre of the photic zone whilst dissolving.

In some embodiments, the urea may be provided in the form of small, spherical pills having an air bubble inside. The air bubble would slow the rate of sinking to allow for complete dissolving of the urea while the pill is in the photic zone. The rate of sinking of these pills (which depends on pill density and diameter) could be estimated using Stokes law.

Alternatively, the urea could be mixed with fresh water at the dock in order to achieve a solution having a satisfactory density.

The ship could deliver the urea as it steams along a predetermined path, chosen to produce an extensive phytoplankton patch in a desirable location. Alternatively, the ship could steam in a grid pattern throughout the region.

Additional macro- or micronutrients (e.g. phosphorous or iron) can be added to the urea solution at an appropriate concentration if needed. Alternatively, such macro- or micronutrients could be delivered to the ocean separately.

Approximately a week after the source of nitrogen has been delivered into the ocean, a phytoplankton patch will occur. The existence of this patch can be monitored down current of the injection points, for example by satellite or by a second boat (or by the ship which originally injected the urea) and the concentration of the phytoplankton can be measured.

If desirable, the ship (or another ship) containing urea could return to that region of the ocean and add additional amounts of urea to further increase or maintain the increased number of phytoplankton in the desired region.

The released urea forms a nutrient plume in the photic zone, which is spread by the ocean mixing throughout the photic zone. Ocean currents and diffusion assist in the dispersion of nitrogen through the region. The presence of the added nitrogen together with sunlight enables the phytoplankton in the photic zone to multiply as the source of nitrogen (e.g. urea) and other added nutrients or naturally occurring nutrients are consumed. In this manner, phytoplankton patches of substantial size could be maintained for some time.

Dead phytoplankton and organic material comprising excretion from zooplankton subsequently fall to lower levels of the water column (i.e. the deep ocean) as organic detritus, and the ocean current carries the urea and phytoplankton over the sea bed. The organic detritus carries with it carbon originating from carbon dioxide from the atmosphere, enabling effective sequestering of carbon to deeper ocean layers or the sea bed. As the amount of carbon dioxide that could be sequestered from the atmosphere is proportional to the amount of additional phytoplankton produced, phytoplankton patches of substantial size and which are maintained for some time could sequester large amounts of carbon dioxide.

It will be appreciated that delivering a source of nitrogen (e.g. urea) from a floating vessel offers numerous advantages over the use of fixed pipelines to deliver the source of nitrogen. For example, as described above, a floating vessel could be used to cause a long-lasting phytoplankton patch over a large region of the ocean despite fluctuations in the currents advecting the urea from the point of injection.

Whilst urea is a preferred source of nitrogen, other compounds which are sources of nitrogen (e.g. ammonia) could be used in the method of the second aspect set out above. As noted above, compounds such as ammonia are less preferred because they are more difficult to handle than urea and are, in fact, classified as dangerous chemicals. However, in some embodiments of the second method, such problems could be overcome and ammonia could be added to the photic layer by bubbling gaseous ammonia from an outlet located beneath the ship. Alternatively, ammonia in solution could be sprinkled either onto the surface of the ocean, where it sinks into the photic zone, or directly into the photic zone at the predetermined depth from the ship.

Furthermore, additional helpful macronutrients (e.g. phosphates) or micronutrients (e.g. iron) could also be added to the urea/other source of nitrogen and delivered to the photic zone if it were determined that the presence of such nutrients may further increase the number of phytoplankton.

A specific embodiment of the method described above that was performed in the South Pacific Ocean will now be described.

A ship carrying urea in 40 kg bags sailed to a region in the high seas to confirm the utility of the methods described above. The urea (10 kg) was dissolved in a 60 liter container of seawater taken from the region. Phosphorus, in the form of superphosphate, was also dissolved in the container in the Redfield ratio. The density of the resultant solution was 1075 $kg/m^3$. The solution was then poured onto the sea from the ship. This was repeated three times in different locations.

To verify that a solution containing urea and superphosphate was effective in promoting a growth in the phytoplankton population of seawater taken from the locations (i.e. dissolved inorganic carbon is converted into organic carbon), two samples of the ambient sea water were collected from each location. The initial chlorophyll concentrations in the locations was 0.25 µg/L, 0.25 µg/L and 0.1 µg/L. As those skilled in the art will appreciate, these are relatively low concentrations of chlorophyll in seawater, and these regions can be thought of as "desert" regions of the ocean.

One sample from each location was dosed with urea and superphosphate in the Redfield ratio, and the other was maintained as a control. The samples were exposed to natural sunlight and kept in a water bath for 4 days. At the end of the period, the chlorophyll concentration in the dosed bottles was higher than in the control bottles, indicating that the number of phytoplankton had been caused to increase.

As noted above, in a third aspect there is provided a method for producing carbon credits comprising the step of sequestering carbon dioxide using the method of the first or second aspect (e.g. the methods described above).

Many countries have established carbon offset markets following the guidelines of the Kyoto Protocol. Basically, industries which generate carbon dioxide (e.g. fossil fuel burning industries) are required to offset their carbon emissions by purchasing certified emission reduction credits. Such emission reduction credits can, for example, be obtained by planting trees or purchasing "clean" energy.

It is envisaged that the methods disclosed herein, which could be used to sequester carbon dioxide from the atmosphere for a significant period of time, could be a very cost effective way to offset an industry's carbon emissions.

It will be appreciated by those skilled in the art that the methods set forth in the Summary are not intended to be limited by the specific embodiments described above.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

The invention claimed is:

1. A method for removing carbon dioxide from the atmosphere, the method comprising delivering urea from a floating vessel to a region of a photic zone of an ocean, whereby the number of phytoplankton is caused to increase in the region upon addition of the urea, wherein the floating vessel is a boat or ship.

2. The method of claim 1, wherein the region is located such that carbon dioxide is sequestered from the atmosphere for a significant period of time.

3. The method of claim 2, wherein carbon dioxide is sequestered from the atmosphere for greater than 100 years.

4. The method of claim 1, wherein the region is located at the edge of a continental shelf or over a deep ocean.

5. The method of claim 1, wherein the urea is in granular form and is mixed on the floating vessel immediately before delivery with water taken from the region.

6. The method of claim 1, wherein the urea is injected into the region at a predetermined depth.

7. The method of claim 6, wherein the predetermined depth is between 15 and 50 meters.

8. The method of claim 1, wherein the urea is in granular form and is sprinkled from the floating vessel over the surface of the ocean above the region.

9. The method of claim 8, wherein the granules of urea contain air pockets inside the granules.

10. The method of claim 1, wherein the amount of urea delivered to the region results in the concentration of urea in the region being between about 0.1 mole/L to about 10 mole/L.

11. The method of claim 1, wherein one or more additional macronutrients are delivered to the photic zone with the urea.

12. The method of claim 11, wherein the one or more additional macronutrients is phosphate.

13. The method of claim 1, further comprising the step of monitoring the increased number of phytoplankton, and adding more urea to further increase or maintain an increased number of phytoplankton.

14. A method for producing carbon credits, the method comprising removing carbon dioxide from the atmosphere using the method of claim 1.

15. A system for producing carbon credits by removing $CO_2$ from the atmosphere using the method of claim 1, the system comprising a floating vessel comprising a boat or ship for delivering urea to a region of a photic zone of an ocean, whereby, upon delivery of the urea to the region, the number of phytoplankton is caused to increase.

16. A method for removing carbon dioxide from the atmosphere, the method comprising:
    delivering a source of nitrogen from a floating vessel to a region of the photic zone of an ocean, wherein the floating vessel is a boat or ship, and whereby the number of phytoplankton is caused to increase in the region upon addition of the source of nitrogen wherein the source of nitrogen is urea;
    monitoring the increased number of phytoplankton; and
    adding more of the source of nitrogen to a portion of the region in which it is possible to further increase or maintain an increased number of phytoplankton.

17. The method of claim 16, wherein one or more additional macronutrients are delivered to the photic zone with the source of nitrogen.

18. The method of claim 16, wherein the increased number of phytoplankton is monitored by satellite or by a second boat or ship down current of the floating vessel.

19. The method of claim 16, wherein a dye is delivered to the photic zone with the source of nitrogen to aid in monitoring the increased number of phytoplankton.

20. A method for producing carbon credits, the method comprising removing carbon dioxide from the atmosphere using the method of claim 16.

* * * * *

UNITED STATES PATENT AND TRADEMARK OFFICE
CERTIFICATE OF CORRECTION

PATENT NO. : 8,753,863 B2  
APPLICATION NO. : 12/597700  
DATED : June 17, 2014  
INVENTOR(S) : Ian Stanley Ferguson Jones et al.

Page 1 of 1

It is certified that error appears in the above-identified patent and that said Letters Patent is hereby corrected as shown below:

In the Claims

Column 8, in claim 10, line 10: delete "0.1 mole/L" and insert -- 0.1 µmole/L --, therefor.

Column 8, in claim 10, lines 10-11: delete "10 mole/L." and insert -- 10 µmole/L. --, therefor.

Signed and Sealed this
Third Day of March, 2015

Michelle K. Lee
*Deputy Director of the United States Patent and Trademark Office*